May 31, 1938.  F. V. HUNT  2,119,389
FREQUENCY METER
Filed Dec. 6, 1935   4 Sheets-Sheet 3
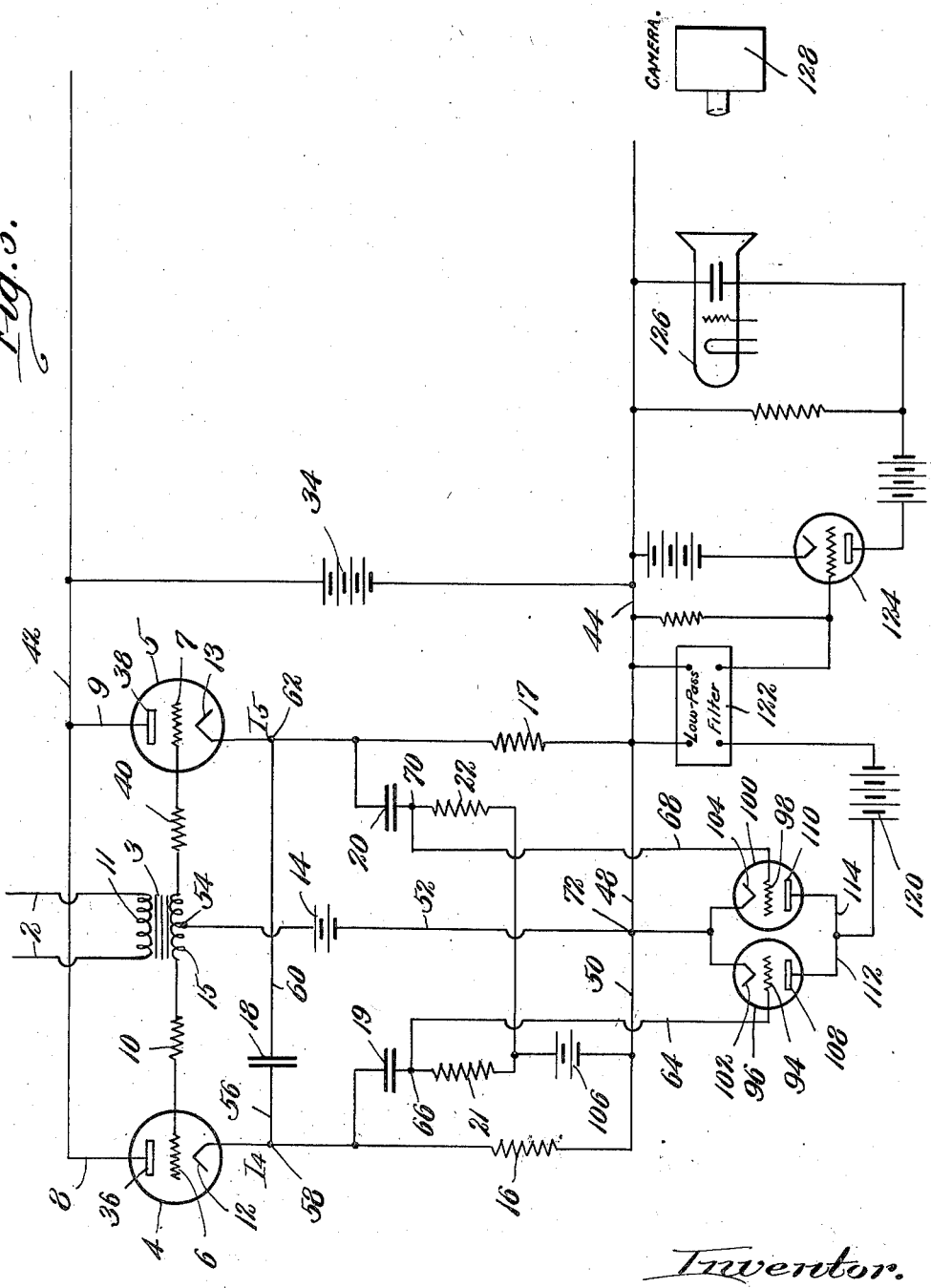
Inventor.
Frederick V. Hunt.
by David Rines
Atty.

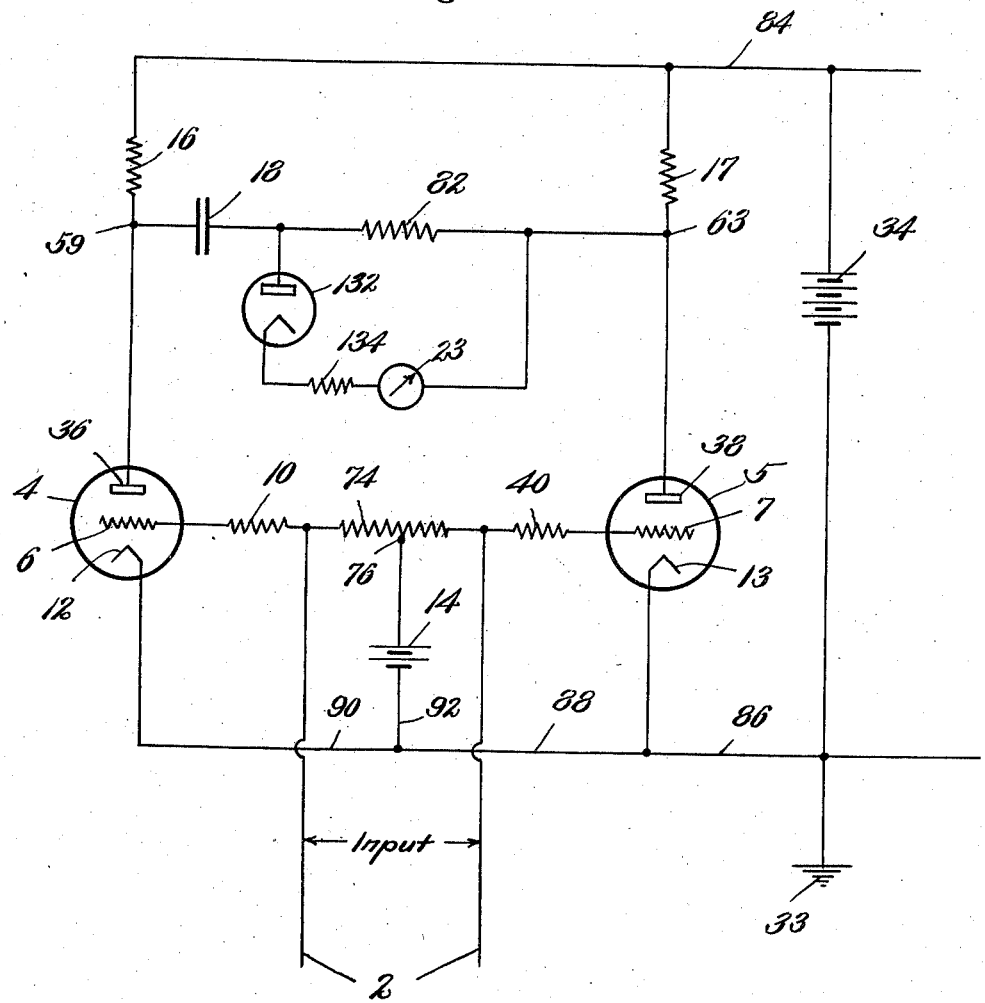

Patented May 31, 1938

2,119,389

UNITED STATES PATENT OFFICE 2,119,389

FREQUENCY METER

Frederick Vinton Hunt, Cambridge, Mass., assignor of one-half to General Radio Company, Cambridge, Mass., a corporation of Massachusetts Application December 6, 1935, Serial No. 53,203

17 Claims. (Cl. 175—368)

The present invention relates to electric systems and apparatus, and more particularly to measuring or recording systems. From a more limited aspect, the invention relates to instruments, particularly of the electronic type, for measuring, indicating or recording electric impulses, including the frequency of electric oscillations, such as are met with in the use of alternating systems. It will be understood, however, that the term "frequency of electric oscillation" or its equivalent is employed hereinafter, in the specification and the claims, in a generic sense, to include the frequency of occurrence of any phenomenon that varies in any way with time and from which, by suitable means, an electrical impulse may be obtained. Among examples may be mentioned the revolution of a shaft or the vibration of a mechanical system. The term "electric oscillation" may embrace also any type of electric signal, such as may be obtained by periodically closing a key.

An object of the invention is to provide a new and improved instrument for measuring, indicating or recording electric impulses. Another object is to provide a new and improved instrument for measuring, indicating or recording the average frequency of occurrence of electric phenomena of the above-described character.

Another object is to provide a new and improved, electronic frequency meter for measuring the frequency of reversal of an alternating-current source.

Still another object is to provide an instrument of the above-described character that, in conjunction with suitable recording means, may be employed for recording the instantaneous frequency of electric oscillations as a function of time.

A further object is to provide an instrument of the above-described character that shall be largely independent of the amplitude and the wave form of the oscillations.

Still a further object is to provide a new and improved, two-tube system.

Other and further objects will be explained hereinafter and will be particularly pointed out in the appended claims.

Figure 1:
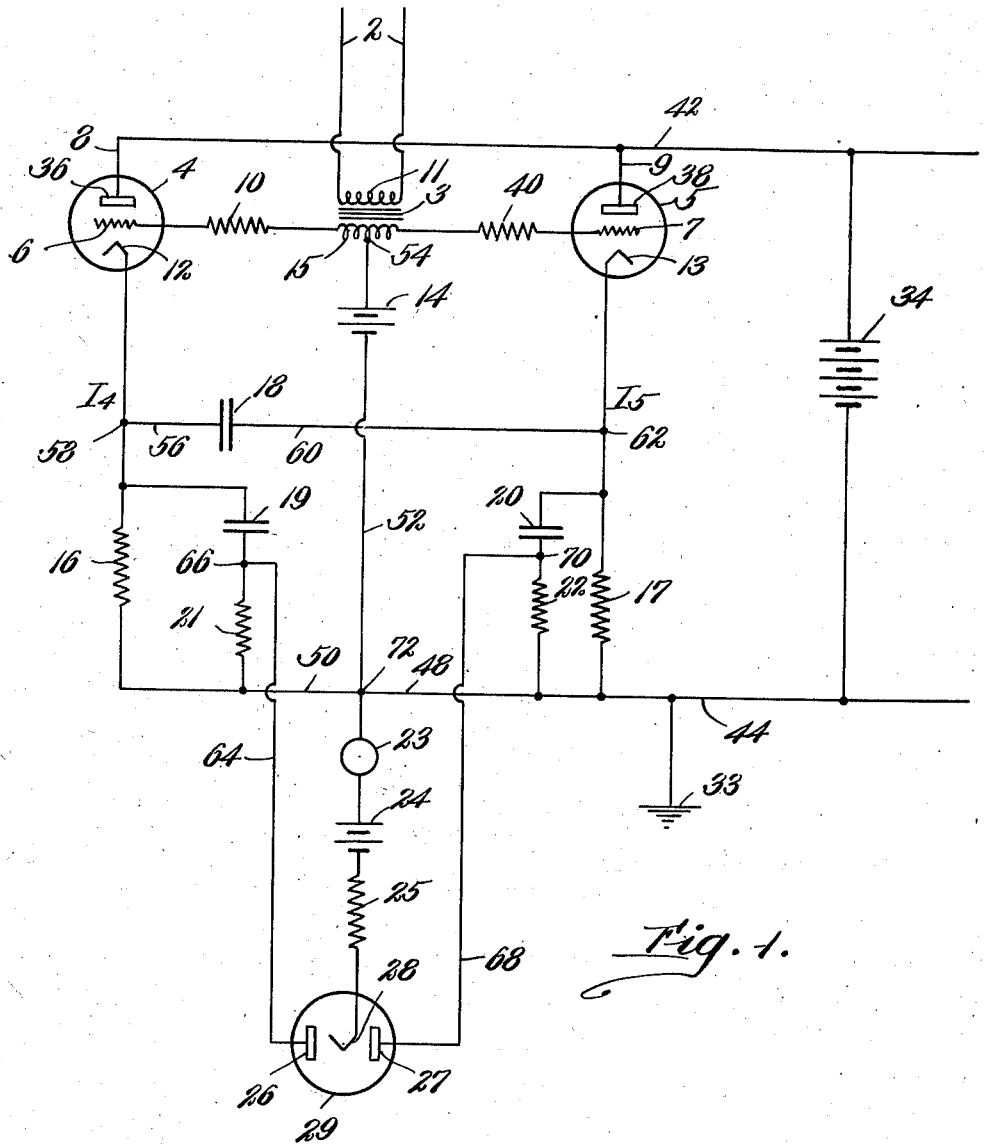
Figure 2:
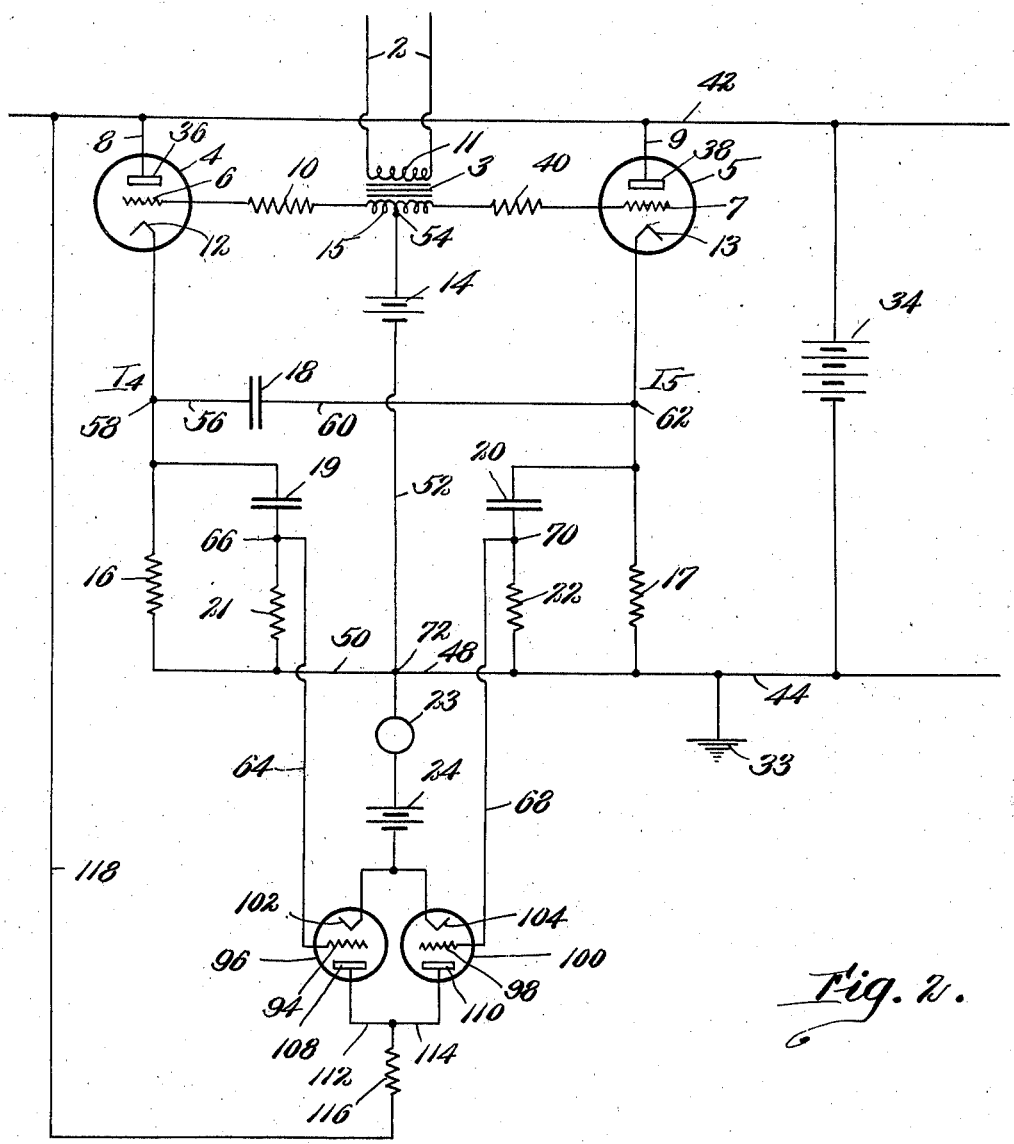

The invention will now be more fully explained in connection with the accompanying drawings, in which Fig. 1 is a diagrammatic view of circuits and apparatus arranged and constructed according to a preferred embodiment of the present invention; and Figs. 2, 3, and 4 are similar views of modifications.

In order to fix the ideas, it will be assumed that it is desired to indicate, measure or record the frequency of the electric oscillations in a circuit 2. The circuit 2 may be any source of alternating current; for example, it may carry an electric signal that is applied directly (Fig. 4), or through an input transformer 3 (Figs. 1, 2, and 3), to an electric system in which are connected two tubes 4 and 5. The primary winding 11 of the transformer 3 is directly connected with the source of alternating current, as by means of input terminals, and the secondary winding 15 of the transformer is connected with the tubes 4 and 5, as hereinafter described. The secondary winding 15 is center-tapped at 54. In Fig. 4, a resistor 74 is similarly shown.

The tubes 4 and 5 are of the grid-controlled-rectifier, low-power, gas-discharge, or thyratron type, with short deionization time. The tube 4 is shown provided with a control grid 6, a cathode or filament 12 and an anode or plate 36, and the tube 5 with a control grid 7, a cathode or filament 13, and an anode or plate 38. Tubes of this type, as is well known, are characterized by the property of remaining essentially non-conducting while the grid or control voltage remains less than a certain critical value; whereas, as soon as the control voltage exceeds this critical value, the tube will conduct a current which is independent of the subsequent values of the control voltage. The tube may be rendered non-conducting again if the anode voltage is momentarily removed while the control voltage is less than the critical value. This will presently be explained more fully by describing the excursions of potential of various parts of the circuit during a typical cycle of operation.

One end of the resistor 74 (Fig. 4) or of the secondary winding 15 of the transformer 3 (Figs. 1, 2, and 3) is connected with the grid 6, in series with a resistor 10; and its other end is connected with the grid 7, in series with a resistor 40. The control grids 6 and 7 are thus connected together, through the resistors 10 and 40, in mutually opposing phase relation, to the alternating-current source 2. As will presently be explained, it is thus possible to render the tubes 4 and 5 alternately conducting in response to reversals in potential of the source 2.

Referring first to Figs. 1, 2, and 3, when the potential of the grid 7 of the thyratron 5 varies in such a way that the grid 7 is carried sufficiently positive, an arc discharge in the tube 5 will be initiated, and the potential of the cathode 13 of the tube 5 will be raised abruptly to a value equal to that of a plate-supply battery 34, less the tube drop in the tube 5. Similar considerations apply for the tube 4. A function of the resistors 10 and 40 is to prevent the flow of excessive grid current in the tubes, which might otherwise shorten their useful life; they also reduce the load on the input transformer 3. A typical value of the resistance of each of these resistors, which was found suitable for a particular type of thyratron in a practical embodiment of this invention, that provided a meter having a wide frequency range, was 150,000 ohms.

Still referring to Figs. 1, 2, and 3, the output circuit of the tube 5 may be traced from the anode 38, by way of conductors 9 and 42, through the battery 34, by way of a conductor 44 and a resistor 17, to the cathode 13. The output circuit of the tube 4 may similarly be traced from the anode 36, by way of conductors 8 and 42, through the battery 34, by way of conductors 44, 48 and 50 and a resistor 16, to the cathode 12.

The input circuit of the tube 5 extends from the cathode 13, through the resistor 17, by way of the conductor 48 and a conductor 52, and through a local, grid-biasing battery 14, to the tap 54 of the secondary winding 15 of the transformer 3. The circuit continues from the tap 54, through part of the secondary winding 15 and the resistor 40, to the grid 7. A function of the battery 14 is to maintain the potential of the grids 6 and 7 below the critical value in the absence of an input signal.

The input circuit of the tube 4 similarly comprises the cathode 12, the resistor 16, the conductors 50 and 52, the battery 14, the tap 54, the remaining part of the secondary winding 15, the resistor 10 and the grid 6.

A metering condenser 19 and a metering resistor 21 are shunted around the resistor 16, and a metering condenser 20 and a metering resistor 22 around the resistor 17. One plate of a commutating condenser 18 is connected by a conductor 56 to a point 58 between the cathode 12 and the resistor 16, and its other plate is connected by a conductor 60 to a point 62 between the cathode 13 and the resistor 17. The left-hand plate of the condenser 18 is connected to the same point 58 to which the cathode 12 and the upper plate of the condenser 19 is connected; and the right-hand plate of the condenser 18 is connected to the same point 62 to which the upper plate of the condenser 20 and the cathode 13 are connected.

The tubes 4 and 5 being thus each provided with an input circuit and an output circuit, current will flow in the respective circuits if the elements be suitably chosen and if the voltages are of suitable value. The resistances of the resistors 16, 17 and of the resistors 21 and 22 are preferably equal; in the before-mentioned embodiment of the invention, the resistance of each of these resistors was 3,000 ohms. The other elements, too, may be varied; in the said embodiment, the local biasing battery 14 supplied 9 volts negative (though it may be positive, depending upon the tubes and other apparatus employed), and the battery 34 was of 90 volts. The value of the condenser 18 was 0.002 mfd., and that of each of the condensers 19 and 20 was 0.0005 mfd.

As before stated, the circuits are designed so that one only of the tubes 4 and 5 is in the conducting state at any one moment, the other tube being then non-conducting. During the conducting state of the tube 5, it will carry a current $I_5$ determined by the supply voltage of the battery 34, the resistance of the resistor 17, and the tube-drop characteristic of the tube 5.

The cathode 13 of the tube 5 is then at a positive potential, with respect to a ground connection 33, equal to the product of the current $I_5$ and the resistance of the resistor 17. Representing the latter by the symbol $R_{17}$, this potential value is $I_5 R_{17}$. After the tube 5 has become non-conducting, of course, the current $I_5$ will be zero.

During the conducting state of the tube 4, similarly, it will carry a current $I_4$ determined by the supply voltage of the battery 34, the resistance of the resistor 16, and the tube-drop characteristic of the tube 4. The cathode 12 of the tube 4 is then at a positive potential, with respect to the ground connection 33, equal to the product of the current $I_4$ and the resistance of the resistor 16. Representing this latter value by the symbol $R_{16}$, this potential value is $I_4 R_{16}$. After the tube 4 has become non-conducting, the current $I_4$ will be zero. In general, with suitably chosen circuit elements, the currents $I_4$ and $I_5$ will be approximately equal.

An associated circuit will now be described, the function of which is to count or otherwise indicate the number of transient, electric pulses produced in the circuit, as hereinafter explained; and, in the case of alternating currents, to measure the frequency of the reversals of the current, since this involves merely the counting of the number of successive cycles of the alternating phenomenon per unit of time.

According to the embodiment illustrated in Fig. 1, an auxiliary circuit is provided, comprising a double-diode, rectifier tube 29 provided with two anodes 26 and 27 and a cathode 28. The anode 26 is connected by a conductor 64 to a point 66 between the metering resistor 21 and the metering condenser 19. The anode 27 is similarly connected by a conductor 68 to a point 70 between the metering resistor 22 and the metering condenser 20. Rectified current is thus adapted to flow from the cathode 28, through a resistor 25, a small, polarizing, local battery 24 and a direct-reading, frequency-indicating instrument 23, to a point 72 between the conductors 48 and 50, and thence, by way of the conductor 50 and the resistor 21, to the point 66; and from the point 66, by way of the conductor 64, to the anode 26. Rectified current is similarly adapted to flow from the cathode 28, through the same elements 25, 24, 23, and 72, by way of the conductor 48 and the resistor 22, to the point 70; and from the point 70, by way of the conductor 68, to the anode 27. The auxiliary circuit is also interconnected with the portions of the circuit described above by the metering condensers 19 and 20.

The use of the local battery 24 is optional; it may be provided if it is desired to oppose the residual contact potential existing in the diode circuit and prevent a small, constant current flowing continuously in the rectifier circuit. It also permits the hereinafter-mentioned calibration curve to pass through the origin. A typical satisfactory value for the voltage of this local battery, as employed in the said embodiment, is 1.5 volts.

It may be assumed that, at the beginning, the tube 4 is non-conducting and the tube 5 conducting, so as to carry its normal plate current. Then $I_5$ has the value before given; and as $I_4$ is zero, the cathode 12 of the tube 4 is at zero potential. The condensers 18 and 20 are charged to the potential of the point 62, which is the same as the potential of the cathode 13. The condenser 19, in this initially assumed condition, is uncharged, both plates of the condenser 19 and the cathode 12 being at ground potential. These conditions are perfectly stable, and will persist, assuming that the tube 5 remains conducting and the tube 4 remains non-conducting, irrespective of the variations that may occur in the grid potentials, so long as such variations do not alter the conductivity of the two tubes 4 and 5. These conditions are representative of the stable condition that attains so long as the signal voltage in the circuit 2 is on one portion of the cycle of oscillation, corresponding to one polarity.

This stable condition becomes destroyed as soon as the signal voltage travels to the other portion of its cycle, corresponding to the opposite polarity. The potential supplied to the grid 7 of the tube 5 becomes then decreased and that supplied to the grid 6 of the tube 4 becomes increased. With proper choice of circuit elements, the potential of the grid 6 will increase to that critical value that renders the tube 4 conducting. The onset of conduction in the tube 5 occurs in a very short time, and sets into operation the following sequence of potential variations. The current $I_4$, which is now established in the tube 4, flows through the resistor 16 and abruptly raises the potential of the cathode 12 to the before-mentioned value. Since the potential of the condenser 19 can not change instantaneously, the point 66 will also be raised momentarily to the before-mentioned potential of the cathode 12. The anode 26 of the rectifier 29 will, therefore, be raised to this value. A charging-current pulse will thus be caused to flow to the condenser 19 from the battery 34, by way of the conductors 44 and 48, to the point 72; thence, by way of the conductor 50, through the resistor 21, to the point 66; and also, by way of the parallel path offered between the points 66 and 72, along the circuit comprising the indicating instrument 23, the local battery 24, the resistor 25, the cathode 28 and the anode 26 of the rectifier 29, and the conductor 64. The circuit continues from the point 66, by way of the condenser 19 to the point 58; thence, by way of the tube 4, conductors 8 and 42, back to the battery 34. After the condenser 19 becomes charged, however, a positive potential no longer exists on the anode 26 of the diode 29, and no further current flows to the indicating instrument 23, no matter how long the current $I_4$ may persist. The integrated value of this current pulse, which is the quantity of electricity, besides depending upon the specific values of the circuit elements, depends only upon the value of the current $I_4$, and not at all upon the length of time that the current $I_4$ is flowing.

During the time that the condenser 19 is becoming charged, other potential readjustments are taking place in the circuit. Since, as before explained, the condenser 18 was originally charged to a potential difference of $I_5R_{17}$, the immediate effect of the increase in the potential of the cathode 12 of the tube 4 is to increase the potential of the cathode 13 of the tube 5 by the potential value $I_4R_{16}$. With an effective adjustment of the circuit, this elevated potential of the cathode 13, equal to $I_5R_{17}+I_4R_{16}$, will be at least equal to, and preferably much higher than, the supply voltage of the battery 34. Since, at the same time, the potential of the grid 7 is, and remains, negative with respect to the cathode 13, and less than the critical starting voltage for the tube 5, the conditions affecting the tube 5 will be such that the grid 7 can regain control, the arc in the tube 5 will become extinguished, and the tube 5 will become non-conducting. This is provided the deionization time of the thyratron tube is not greater than the time required for the condenser 18 to discharge through the resistor 17.

While this state exists, the upper plate of the condenser 20, which is connected to the cathode 13, is likewise raised in potential by the amount $I_4R_{16}$; and a charging-current pulse will, therefore, flow to this condenser by way of the resistor 22, to the point 70; and also through the parallel path containing the conductor 48, the point 72, the indicating instrument 23, the local battery 24, the resistor 25, the cathode 28 and the anode 27 of the rectifier 29, and the conductor 68. This charging current, as described above in connection with the condenser 19, constitutes a current pulse the integrated value of which depends upon the current $I_5$, but not at all upon the length of time during which this current was flowing. Since the tube 5 is now non-conducting, the condenser 18 will discharge through the resistor 17 until the cathode 13 is finally at the potential of the ground 33.

The circuit is now in a new stable condition, exactly like the initial condition before described, except that the tube 4 is now in a conducting state, and the tube 5 is in a non-conducting state. This stable condition will persist so long as the potential of the grid 7 remains below the critical starting value. If the potential of the grid 7 now varies in such a way as to exceed this critical starting voltage, an exactly similar sequence of events will take place, and the space current of the tube will, in effect, be transferred back to the tube 5. Another pair of current impulses will then be delivered to the indicating instrument 23.

When an electric signal in the circuit 2 is applied to the grids of the tubes 4 and 5, through the transformer 3, therefore, the grids of the tubes are successively carried sufficiently positive in response to the variations of the input signal and the before-described sequence of events take place, causing the load current to be transferred from one discharge tube 4 or 5 to the other, and each successive alternation of the input signal thus delivers one current pulse to the indicating instrument 23. A single transient electric pulse of fixed magnitude is obtained in the indicating instrument each time that the discharge shifts from one of the tubes 4 and 5 to the other tube, this pulse, within wide limits, being unaffected by the time elapsing between transfers, and being independent of the duration of the discharge in the individual tubes. The average current flowing in the circuit containing the instrument 23 is, therefore, proportional to the number of pulses delivered per second, that is, to the frequency of alternation of the input signal; which is the same thing as saying that the current is proportional to the frequency of the input signal. More specifically, the current indication is proportional to the frequency with which the polarity of the input voltage reverses algebraic sign; the response of the instrument is linear with frequency, which facilitates calibration, affording direct-reading frequency scales on a standard, current instrument.

This relationship is found to be accurately true for the lower and middle frequencies of the audio range, say, below 7,000 cycles. This is approximately so for higher frequencies also; though the calibration curve of the instrument may, at the higher frequencies, depart slightly from a straight line, without in any way sacrificing the other desirable features of the device.

By appropriate adjustment of the resistance of the resistor 25, it is possible so to vary the output current of the frequency meter as to permit the use of a standard, direct-current indicating instrument 23,—for instance, a microammeter having a range 0 to 500 μa., the scale of which may be read directly in cycles per second. The resistor 25 may be varied to adjust the quantity of electricity which is delivered to the indicating instrument 23 with each alternation of the input voltage. The resistor 25 serves, in addition to adjusting the size of each current pulse delivered to the instrument 23, to limit the peak value of the charging current to the condenser 19 and the condenser 20, and to reduce the shunting action of the internal resistance of the diode 29 upon the resistors 21 and 22, thus indirectly prolonging the life of the tubes 4 and 5. This makes it possible to calibrate the instrument 23 by a single adjustment at some standard frequency, whereupon the microammeter scale becomes a direct-reading, frequency scale. A typical value for the resistance of this resistor 25, as employed in the said practical embodiment, is 7,000 ohms.

A very flexible meter is thus provided that is capable of following rapid variations in the frequency of the input signal. For a given set of circuit constants, the integrated value of each current pulse delivered to the indicating instrument 23 depends only on the voltage to which the metering condensers 18 and 19 become charged, and this voltage will be constant, provided the plate-supply voltage of the battery 34 and the tube drops of the tubes 4 and 5 remain constant. As the frequency indication is almost directly proportional to the plate-supply voltage, however, the supply voltage to the frequency meter should be maintained substantially constant, irrespective of line-voltage variations. This may be effected in any desired manner. Since thyratron tubes have the property of maintaining a constant tube drop after the discharge has been initiated, regardless of the subsequent variations of the grid voltage, the frequency readings of the instrument 23 will be independent of the amplitude and the wave form of the input signal over a wide range, and of the value of the triggering voltage.

The auxiliary circuit is actuated only by the establishing of plate current in one or the other of the thyratron tubes that was previously non-conducting; and the establishment of current in either of the thyratron tubes 4 and 5 corresponds to one-half cycle of the input signal, which is an event that is independent of the duration of the half-cycle that produced it. When the frequency of the signal is not constant, either an accurate indication of the average frequency is thus obtainable, or the output circuit of the instrument may be modified to permit the frequency to be recorded as a function of time. The response speed is sufficient to permit direct study of the frequency variations occurring in speech or singing. As the frequency indications of the instrument do not depend on the uniform spacing of the exciting impulses, it may be used as a high-resolution counter. For example, the average counting rate can be indicated under circumstances in which individual counts may follow each other as closely as $10^{-4}$ seconds.

It is contemplated that, for one half-cycle of operation, the time constant of the metering circuit containing the condenser 20, the resistor 22, and the parallel path of the rectifier 29 should be enough smaller than the time constant of the commutating circuit containing the condenser 18 and the resistor 16 so that the condenser 20 shall become fully charged to its new potential before the condenser 18 shall have discharged enough to alter substantially the elevated potential of the cathode 13. Similarly, for the other half-cycle of operation, the time constant of the metering circuit containing the condenser 19, the resistor 21, and the parallel path of the rectifier 29 should be enough smaller than the time constant of the commutating circuit containing the condenser 18 and the resistor 17 so that the condenser 19 shall become fully charged to its new potential before the condenser 18 shall have discharged enough to alter substantially the elevated potential of the cathode 12. The current pulse delivered to the indicating instrument 23 will then always be completed within the time required to extinguish the arc in the tube 4 or 5, as the case may be, and before the beginning of the next half-cycle of operation. This condition will be satisfied in most practical cases if the product of the resistance of the resistor 22 and the capacity of the condenser 20 (which may be made equal to the product of the resistance of the resistor 21 and the capacity of the condenser 19) is equal to or less than the product of the capacity of the condenser 18 and the resistance of either resistor 16 or 17. Using the values of the circuit elements herein indicated, the entire sequence may be completed in less than 50 microseconds, and the circuit is then ready for the next half-cycle of operation.

In order to secure the maximum range, it will be found desirable to adjust the time constant of the commutating circuits 17, 18, and 16, 18 to the smallest value that will still allow the grids of the tubes 4 and 5 to regain control during the time that the effective anode voltage of these tubes is zero or negative. When this condition is satisfied, it will be found that the sensitivity of the instrument will be increased by increasing the value of the condensers 19 and 20 within the restrictions imposed by the allowable time constants of these condenser circuits.

If the maximum frequency that is to be measured is considerably less than the maximum limit imposed by the deionization time of the discharge tubes 4 and 5, the values of the condensers 18, 19, and 20 may be made larger than above indicated, with a corresponding increase in the sensitivity of the frequency indication.

In the modified circuit illustrated in Fig. 2, the value of the condenser 18 was increased to 0.05 mfd. and the condensers 19 and 20 were increased to 0.05 mfd. This modification yields enough output current to operate a spark recorder, but the recorder illustrated and hereinafter described is preferred. The conductor 64 is connected to a grid 94 of a power-amplifier tube 96; and the conductor 68 to a grid 98 of a power-amplifier tube 100. The anode circuits of the double-diode rectifier 29 of Fig. 1 are replaced by the grid circuits of the power-amplifier tubes 96 and 100. One of these grid circuits extends from the point 72, through the indicating instrument 23 and the local battery 24 to the cathode 102 of the amplifier tube 96; thence to the grid 94, and by way of the conductor 64 to the point 66; and thence, through the resistor 21 and by way of the conductor 50, back to the point 72. The other grid circuit similarly comprises the elements 23, 24, the cathode 104 of the amplifier 100, the grid 98, the conductor 68, the point 70 and the resistor 22. The output circuits of the power-amplifier tubes 96 and 100 may be traced from either cathode 102 or 104, to the anode 108 of the tube 96 or the anode 110 of the tube 100, by way of a conductor 112 or 114 to a resistor 116, thence by way of a conductor 118, to one side of the battery 34, the other side of which is connected with the cathodes 102 and 104 through the point 72. The power-amplifier tubes 96 and 100 are initially biased to cut off by means of the local battery 24; or, as in Fig. 3, by means of a battery 106. Employing the above circuit constants, a linear calibration was yielded up to 300 cycles, and a sensitivity was obtained of approximately 27 microamperes per cycle per second. The output efficiency was materially increased, since the integrated value of the metering pulse is increased as the time constants of the circuits comprising the condensers and the corresponding resistors is increased. The voltage of the input signal, measured across the primary winding 11 of the input transformer 3, could be varied from 5 to at least 300 volts, a range of 35 decibels, without producing any appreciable alteration on the frequency indicated by the output instrument 23. If the input signal is introduced through an amplifier tube (not shown) which is permitted to overload, this range may be extended considerably, at the same time preserving a high input impedance for the instrument.

As is explained in my paper, entitled, "A Direct-Reading Frequency Meter Suitable for High-Speed Recording", published in the Review of Scientific Instruments, Feb. 1935, page 43, and in my thesis entitled, "New Recording Instruments for Frequency and Intensity", submitted to the faculty of the Harvard Engineering School, April 25, 1934, and now deposited in the Harvard University Library, the indicating meter may be in the output circuit of the amplifier tubes 96 and 100; and this is illustrated in Fig. 3, in which a separate battery 120 is shown for supplying the plate current of the amplifier tubes 96 and 100, and where the resistor 116 is replaced by a low-pass filter 122. The filter 122 is connected into the input circuit of an amplifier 124, the output circuit of which is connected to a cathode-ray oscillograph tube 126. The instrument may thus be employed to make a permanent record; say, by means of a film in a camera 128. A high-speed, recording frequency meter is thus provided. Unless the amplitude of some harmonic of the input voltage is large enough to cause the algebraic sign of the input voltage to reverse more often than twice during each fundamental period, the frequency indicated will be that of the fundamental, regardless of the wave form of the signal. A function of the filter 122 is to remove from the output of the meter the individual pulses, corresponding to each reversal in potential of the source, which would otherwise be recorded by the oscillograph; but with adequate filtering and sufficient amplification, only the average value of the pulses will be recorded by this system. In order to secure the maximum recording speed, the cut-off frequency of the filter should lie between one and two times the lowest frequency in the band to be recorded.

The illustrated or other recorder may replace the indicating instrument 23 of Figs. 1, 2, and 4. To avoid circumlocution of language, therefore, the term "indicating instrument" will be employed in the claims to include recording and other measuring instruments.

Referring now to Fig. 4, the output circuit of the tube 5 comprises the anode 38, the resistor 17, a conductor 84, the battery 34, a conductor 86 and the cathode 13. The output circuit of the tube 4 similarly comprises the anode 36, the resistor 16, the conductor 84, the battery 34, conductors 86, 88, and 90, and the cathode 12. The input circuit of the tube 5 comprises the cathode 13, the conductor 88, a conductor 92, the local, grid-biasing battery 14, the tap 76 of the resistor 74, the right-hand part of the resistor 74, the resistor 40 and the grid 7. The input circuit of the tube 4 similarly comprises the cathode 12, the conductors 90 and 92, the battery 14, the tap 76, the remaining part of the resistor 74, the resistor 10 and the grid 6. The resistors 16 and 17 and the condenser 18 are shown disposed on the anode side of the tubes 4 and 5, instead of, as in Figs. 1, 2, and 3, on the cathode side; and instead of the condensers 19 and 20 and the resistors 21 and 22, a metering resistor 82 is inserted between the points 59 and 63, in series with the condenser 18. A diode 132 and a resistor 134 are connected in series with the indicating instrument 23 across the resistor 82.

The circuits illustrated in Figs. 1, 2, and 3 are more convenient than the circuit of Fig. 4 in several particulars; among them, that they are more readily grounded at 33. In the circuit of Fig. 4, greater care is required in the location of the grounding. In Figs. 1, 2, and 3, it is possible easily to keep the instrument 23 in the auxiliary circuit at ground potential.

The operation of the circuit of Fig. 4 is similar in principle to that described above in connection with Fig. 1, but slightly different in detail, because of the different nature of the connections. It will be recalled that, in Fig. 1, use was made of the charging current to the condenser 19, which, flowing through the resistor 21, produced a momentary positive potential on the anode of the diode rectifier 29, and so produced a current pulse in the indicating instrument 23. In Fig. 4, use is made of the charging current to the commutating condenser 18 itself, which, flowing through the metering resistor 82, can similarly provide a momentary positive potential on the anode of a diode rectifier 132 and so produce a current pulse in the indicating instrument 23.

The commutating action of the condenser 18 is not affected materially by the insertion of the metering resistor 82. This action of the circuit may be described briefly by analogy with the detailed explanation of the operation of the circuit of Fig. 1, as follows: assuming that the tube 4 is initially conducting and the tube 5 is initially non-conducting, we may note that the left-hand plate of the condenser 18 is at a positive potential equal to the tube drop across tube 4, while the right-hand plate of the condenser 18 is at the positive potential of the supply battery 34. If the grid 7 of the tube 5 now varies in such way, in response to the input signal 2, that the potential of the grid 7 exceeds the critical value, conduction will be initiated in the tube 5, and the anode 38 of the tube 5 will be abruptly lowered to a positive potential equal to the tube drop across the tube 5. Since the potential difference across the condenser 18 cannot alter instantaneously, the onset of conduction in the tube 5 will momentarily carry the anode 36 of the tube 4 negative. Since, by virtue of the center tap 76, the potential of the grid 6 of the tube 4 will always be less than the critical value at this instant, the discharge in the tube 4 will be extinguished if the time constant of the condenser 18 and the resistor 16 is sufficiently large, as explained above. While the anode 36 of the tube 4 is maintained at a depressed potential, a charging current will flow to the condenser 18 through the metering resistor 82 and the parallel path offered by the diode 132, the resistor 134 and the indicating instrument 23. After the condenser 18 has become charged to its new potential, no further current flows in the indicating instrument 23, however long the conduction in the tube 5 may persist.

As in the circuit of Fig. 1, when another impulse is applied by the exciting signal to the grids 6 and 7, corresponding to the other half-cycle of the input signal, a similar sequence of events will take place and the load current will be transferred to the tube 4. However, the charging current to the condenser 18 for this half-cycle of operation will be in such a direction that the diode 132 is non-conducting and hence no current will flow through the indicating instrument 23. Thus one invariant current pulse is received by the indicating instrument 23 for each alternate half-cycle of the exciting signal.

In the cases both of Fig. 1 and Fig. 4, use is made of the charging current to the condenser 18, which flows only while the current is being transferred from one tube 4 or 5 to the other. The anode current itself is not directly used to actuate the indicating instrument 23. In Fig. 4, this result is effected by taking the potential drop across the resistor 82 to actuate the instrument 23. The corresponding operation in Fig. 1 resides in an alternation of the charges on the condensers 19 and 20 at each reversal of conduction, rather than in using the charging current to the condenser 18. Certain practical advantages result from this substitution.

In both cases, the pulse which is delivered to the auxiliary circuit is an invariant transient pulse. In Fig. 4, the transient pulse is produced by the voltage drop across the resistor 82. In Fig. 1, the transient pulse is produced by the voltage drop across the resistors 21 and 22, associated with condensers 19 and 20, respectively.

If the mechanical period of the indicating instrument is long compared with the period of the electric signal the frequency of which it is desired to measure, the average value of the frequency will be recorded. If the frequency of the input signal is not constant, the average value of the frequency can still be indicated if the mechanical period of the indicating instrument is long compared with the period of the frequency variation of the input signal. If, however, the period of the indicating instrument is short compared with the period of the frequency variation, yet long compared with the period of the input signal itself, then the instantaneous value of the frequency of the input signal will be indicated. This is a desirable feature in many practical applications and is a new feature not possessed by prior-art instruments of this classification. In the event that the frequency of the input signal is changing very rapidly, it is still possible to indicate or record the instantaneous frequency of the input signal by employing an electric filter satisfying conditions equivalent to the conditions just enumerated for the period of the indicating instrument. Further details regarding this adaptation of the invention will be found in the published paper and thesis referred to above.

In the specific embodiments of the invention illustrated and described herein, thyratron tubes are employed to deliver an invariant current pulse to the indicating instrument 23 each time that the polarity of the input signal reverses. It will be understood, however, that the present invention is not restricted to the exact circuits illustrated and described herein. For example, one may, without in any way departing from the spirit or the scope of the invention, employ other devices than the thyratron tubes 4 and 5, but having similar properties; as, for example, a two-tube system embodying high-vacuum tubes connected in a suitable circuit so as to perform the above-described functions; and it will be understood that, if tubes are employed, whether soft or hard, they may have more than a single grid. Four-electrode thyratron tubes, indeed, may have certain advantages with regard to deionization time. From some points of view, indeed, the invention, within the spirit and scope of the appended claims, may be carried out with but a single tube, as will be obvious to persons skilled in the art. The principles underlying the invention, furthermore, may be utilized to count other phenomena than the frequency of alternating currents. The invention resides in the combinations and the arrangements of the parts for producing the above-described results, and is not limited to specific pieces of apparatus or specific circuit connections. Additional modifications, too, will occur to persons skilled in the art. It is desired, therefore, that the appended claims be broadly construed, except insofar as it may be necessary to impose limitations in view of the prior art.

What is claimed is:

1. A meter comprising two elements adapted to be rendered alternately conducting in response to pulsations of a source of current, means connecting the elements to the source, means for maintaining each element conducting until the other element becomes conducting and for thereafter rendering it non-conducting, responsive means, and an auxiliary circuit for delivering to the responsive means two transient pulses in the same direction for each pulse of the source in a given sense.

2. A meter for measuring the frequency of reversal of an alternating-current source comprising two elements adapted to be rendered alternately conducting in response to reversals in potential of the source, means connecting the elements to the source, means for maintaining each element conducting until the other element becomes conducting and for thereafter rendering it non-conducting, responsive means, and an auxiliary circuit for delivering to the responsive means a transient pulse in the same direction for each reversal in potential of the source.

3. A meter for measuring the frequency of reversal of an alternating-current source comprising two grid-controlled, gas-discharge tubes each having a cathode, an anode, and a control grid, means connecting the two control grids in mutually opposing phase relation to the alternating-current source, whereby the tubes become alternately conducting in response to reversals in potential of the said alternating-current source, conduction in one tube persisting until the commencement of conduction in the other, a condenser connected to charge in alternating direction on the occasion of each such alternation of conduction, and indicating means responsive to the total number of alternations per second in the direction of the charge on the condenser.

4. A meter for measuring the frequency of an alternating-current source comprising two grid-controlled, gas-discharge tubes each having a cathode, an anode, and a control grid, means connecting the two control grids in mutually opposing phase relation to the source to produce discharges alternately in the tubes in response to reversals in potential of the source, means for alternately maintaining the discharge in one tube until the establishment of a discharge in the other tube and for thereafter stopping the discharge in the said one tube, means for producing an electric pulse each time that the discharge shifts from one tube to the other tube, and means controlled by the electric pulses for indicating the frequency of reversals in potential of the source.

5. A meter for measuring the frequency of an alternating-current source comprising two grid-controlled, gas-discharge tubes each having a cathode, an anode and a control grid, means connecting the two control grids in mutually opposing phase relation to the source to produce discharges alternately in the tubes in response to reversals in potential of the source, means for alternately maintaining the discharge in one tube until the establishment of a discharge in the other tube and for thereafter stopping the discharge in the said one tube, resistor means for producing a transient electric pulse each time that the discharge shifts from one tube to the other tube, and means controlled by the electric pulses for indicating the frequency of reversals in potential of the source.

6. A meter for measuring the frequency of an alternating-current source comprising two grid-controlled, gas-discharge tubes each having a cathode, an anode and a control grid, an input circuit connecting the cathode and the control grid of each tube, an output circuit connecting the cathode and the anode of each tube, means for energizing the output circuits, means connecting the two control grids in mutually opposing phase relation to the source to render the tubes alternately conducting in response to reversals in potential of the source, a condenser connected between the cathodes, whereby opposite plates of the condenser are at the same potential as the respective cathodes, resistor means whereby the condenser is charged in reversed direction for each reversal in potential of the source, an indicating instrument, and means controlled by the condenser and the resistor means for indicating the frequency of reversals in potential of the source.

7. A meter for measuring the frequency of an alternating-current source comprising two grid-controlled, gas-discharge tubes each having, in addition to a control grid, two electrodes, namely, a cathode and an anode, circuits interconnecting the cathode, the grid and the anode of each tube, a condenser connecting corresponding cathodes of the tubes, resistor means connected with the circuits, means connecting the two control grids in mutually opposing phase relation to the source to render the tubes alternately conducting in response to reversals in potential of the source, an indicating instrument, and means controlled by the condenser and the resistor means for indicating the frequency of reversals in potential of the source.

8. A meter for measuring the frequency of an alternating-current source comprising two grid-controlled, gas-discharge tubes each having a cathode, an anode and a control grid, an input circuit connecting the cathode and the grid of each tube, an output circuit connecting the cathode and the anode of each tube, means for energizing the output circuits, an impedance provided with a tap, and means for connecting the portions of the impedance on opposite sides of the tap in the respective input circuits.

9. A meter for measuring the frequency of an alternating-current source comprising two grid-controlled, gas-discharge tubes each having a cathode, an anode and a control grid, an input circuit connecting the cathode and the grid of each tube, an output circuit connecting the cathode and the anode of each tube, means for energizing the output circuits, an impedance provided with a tap, means for connecting the portions of the impedance on opposite sides of the tap in the respective input circuits, and an impedance in each input circuit between the first-named impedance and the corresponding grid.

10. A meter for measuring the frequency of an alternating-current source comprising two grid-controlled, gas-discharge tubes each having a cathode, an anode and a control grid, an input circuit connecting the cathode and the grid of each tube, an output circuit connecting the cathode and the anode of each tube, means for energizing the output circuits, a transformer having a primary winding and a secondary winding provided with a tap, means for connecting the portions of the secondary winding on opposite sides of the tap in the respective input circuits, and means connecting the primary winding with the source.

11. A meter for measuring the frequency of an alternating-current source comprising two grid-controlled, gas-discharge tubes each having a cathode, an anode and a control grid, an input circuit connecting the cathode and the grid of each tube, an output circuit connecting the cathode and the anode of each tube, means for energizing the output circuits, means connecting the two control grids in mutually opposing phase relation to the source to render the tubes alternately conducting in response to reversals in potential of the source, a condenser connected between the cathodes, an auxiliary circuit, two condensers connected in the auxiliary circuit, opposite plates of the first-named condenser being connected to one plate of each of the second-named condensers, whereby the said one plate of one of the second-named condensers and one plate of the first-named condenser are at the same potential as one of the cathodes and the said one plate of the other of the second-named condensers and the other plate of the first-named condenser are at the same potential as the other cathode, an indicating instrument, means for connecting the indicating instrument with the other plates of the second-named condensers, and means for causing the indicating instrument to indicate the frequency of reversals in potential of the source.

12. A meter for measuring the frequency of an alternating-current source comprising two grid-controlled, gas-discharge tubes each having a cathode, an anode and a control grid, an input circuit connecting the cathode and the grid of each tube, an output circuit connecting the cathode and the anode of each tube, means for energizing the output circuits, means connecting the two control grids in mutually opposing phase relation to the source to render the tubes alternately conducting in response to reversals in potential of the source, a condenser connected between the cathodes, an auxiliary circuit, two condensers connected in the auxiliary circuit, opposite plates of the first-named condenser being connected to one plate of each of the second-named condensers, whereby the said one plate of one of the second-named condensers and one plate of the first-named condenser are at the same potential as one of the cathodes and the said one plate of the other of the second-named condensers and the other plate of the first-named condenser are at the same potential as the other cathode, rectifier means, an indicating instrument controlled by the rectifier means, and means for causing the indicating instrument to indicate the frequency of reversals in potential of the source.

13. A meter for measuring the frequency of an alternating-current source comprising two grid-controlled, gas-discharge tubes each having a cathode, an anode and a control grid, an input circuit connecting the cathode and the grid of each tube, an output circuit connecting the cathode and the anode of each tube, means for energizing the output circuits, means connecting the two control grids in mutually opposing phase relation to the source to render the tubes alternately conducting in response to reversals in potential of the source, a condenser connected between the cathodes, an auxiliary circuit, two condensers connected in the auxiliary circuit, opposite plates of the first-named condenser being connected to one plate of each of the second-named condensers, whereby the said one plate of one of the second-named condensers and one plate of the first-named condenser are at the same potential as one of the cathodes and the said one plate of the other of the second-named condensers and the other plate of the first-named condenser are at the same potential as the other cathode, a resistor in series with the other side of each second-named condenser, a resistor in shunt with the corresponding first-named resistor and the condenser in series therewith, rectifier means, an indicating instrument, means connecting one side of the indicating instrument to the rectifier means and the other side to the means for energizing the output circuits, and means connecting the rectifier means to a point between each second-named condenser and the resistor in series therewith.

14. A meter for measuring the frequency of an alternating-current source comprising two grid-controlled, gas-discharge tubes each having a cathode, an anode and a control grid, an input circuit connecting the cathode and the grid of each tube, an output circuit connecting the cathode and the anode of each tube, means for energizing the output circuits, means connecting the two control grids in mutually opposing phase relation to the source to render the tubes alternately conducting in response to reversals in potential of the source, a condenser connected between the cathodes, an auxiliary circuit, two condensers connected in the auxiliary circuit, opposite plates of the first-named condenser being connected to one plate of each of the second-named condensers, whereby the said one plate of one of the second-named condensers and one plate of the first-named condenser are at the same potential as one of the cathodes and the said one plate of the other of the second-named condensers and the other plate of the first-named condenser are at the same potential as the other cathode, a resistor in series with the other side of each second-named condenser, a resistor in shunt with the corresponding first-named resistor and the condenser in series therewith, rectifier means, an indicating instrument, means connecting one side of the indicating instrument to the rectifier means and the other side to the means for energizing the output circuits, and means connecting the rectifier means to a point between each second-named condenser and the resistor in series therewith, the product of the resistance of one of the second-named resistors and the capacity of its corresponding condenser being equal to or less than the product of the resistance of either of the second-named resistors and the capacity of the first-named condenser.

15. A meter for measuring the frequency of an alternating-current source comprising two grid-controlled, gas-discharge tubes each having a cathode, an anode and a control grid, an input circuit connecting the cathode and the grid of each tube, an output circuit connecting the cathode and the anode of each tube, means for energizing the output circuits, means connecting the two control grids in mutually opposing phase relation to the source to render the tubes alternately conducting in response to reversals in potential of the source, a condenser connected between the cathodes, an auxiliary circuit, two condensers connected in the auxiliary circuit, opposite plates of the first-named condenser being connected to one plate of each of the second-named condensers, whereby the said one plate of one of the second-named condensers and one plate of the first-named condenser are at the same potential as one of the cathodes and the said one plate of the other of the second-named condensers and the other plate of the first-named condenser are at the same potential as the other cathode, an indicating instrument, a resistor, means for connecting the indicating instrument and the resistor in series to the other plates of the second-named condensers, and means for causing the indicating instrument to indicate the frequency of reversals in potential of the source.

16. An electric system comprising a control circuit, a circuit including an electronic device and adapted to alternate between two states of conduction in response to reversals of voltage in the control circuit, one state of conduction persisting for substantially the entire interval between successive reversals, means whereby a transient of magnitude substantially invariant with respect to the frequency of reversal is produced on the occasion of each such reversal, and means responsive to the integrated total per second of such transients.

17. An electric system comprising a control circuit, two circuits each including an electronic device and adapted to vary alternately and in opposite sense between a more-conducting state and a less-conducting state in response to reversals of voltage in the control circuit, the respective states of the two circuits persisting for substantially the entire interval between successive such reversals, means whereby a transient of magnitude substantially invariant with respect to the frequency of reversal is produced on the occasion of each such reversal, and means responsive to the integrated total per second of such transients.

FREDERICK V. HUNT.